Nov. 15, 1966  M. A. CHAVANNES  3,285,793
METHOD OF MANUFACTURING A COMPOSITE CELLULAR MATERIAL
Filed July 19, 1962  3 Sheets-Sheet 1
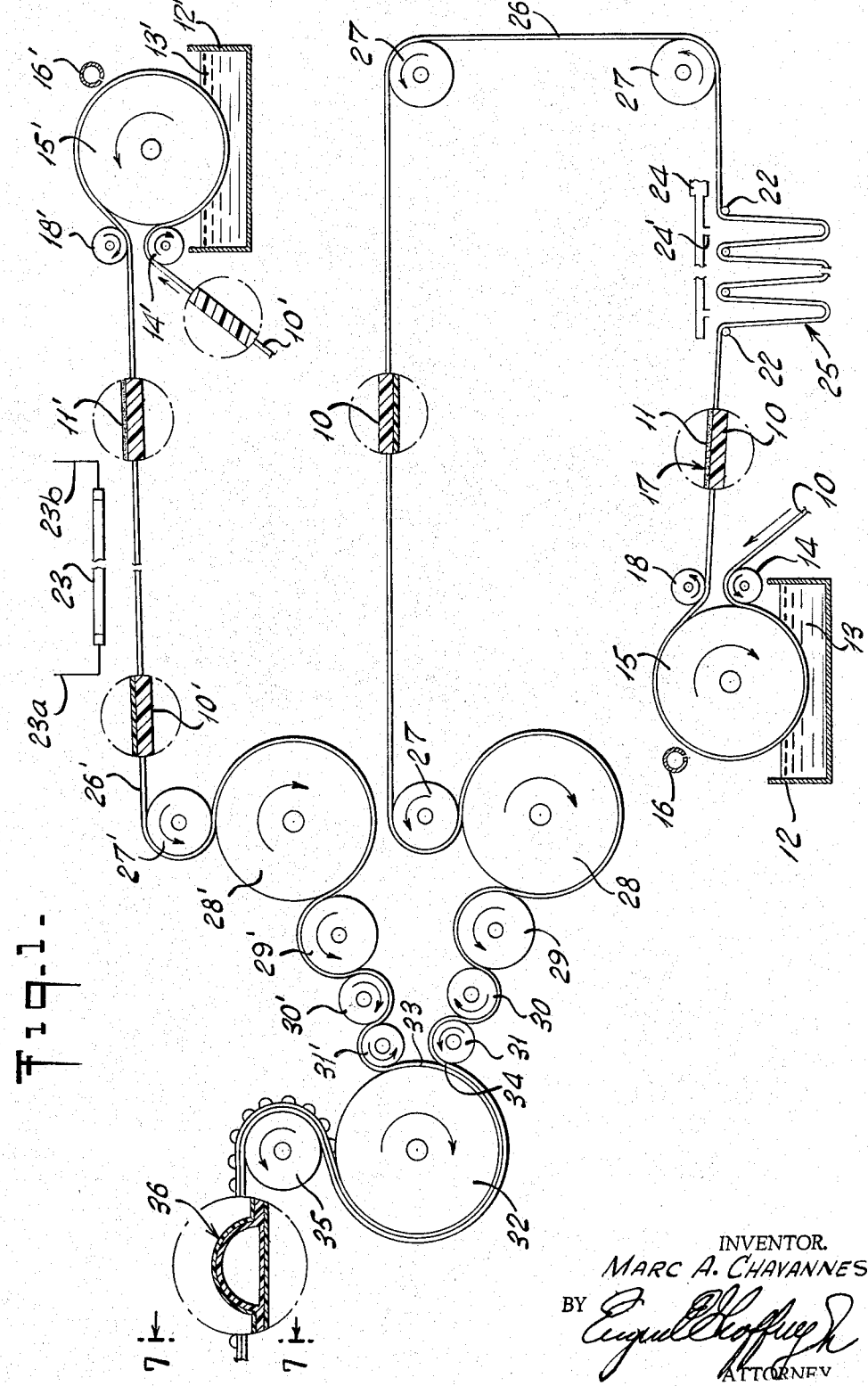
INVENTOR.
MARC A. CHAVANNES
BY
ATTORNEY

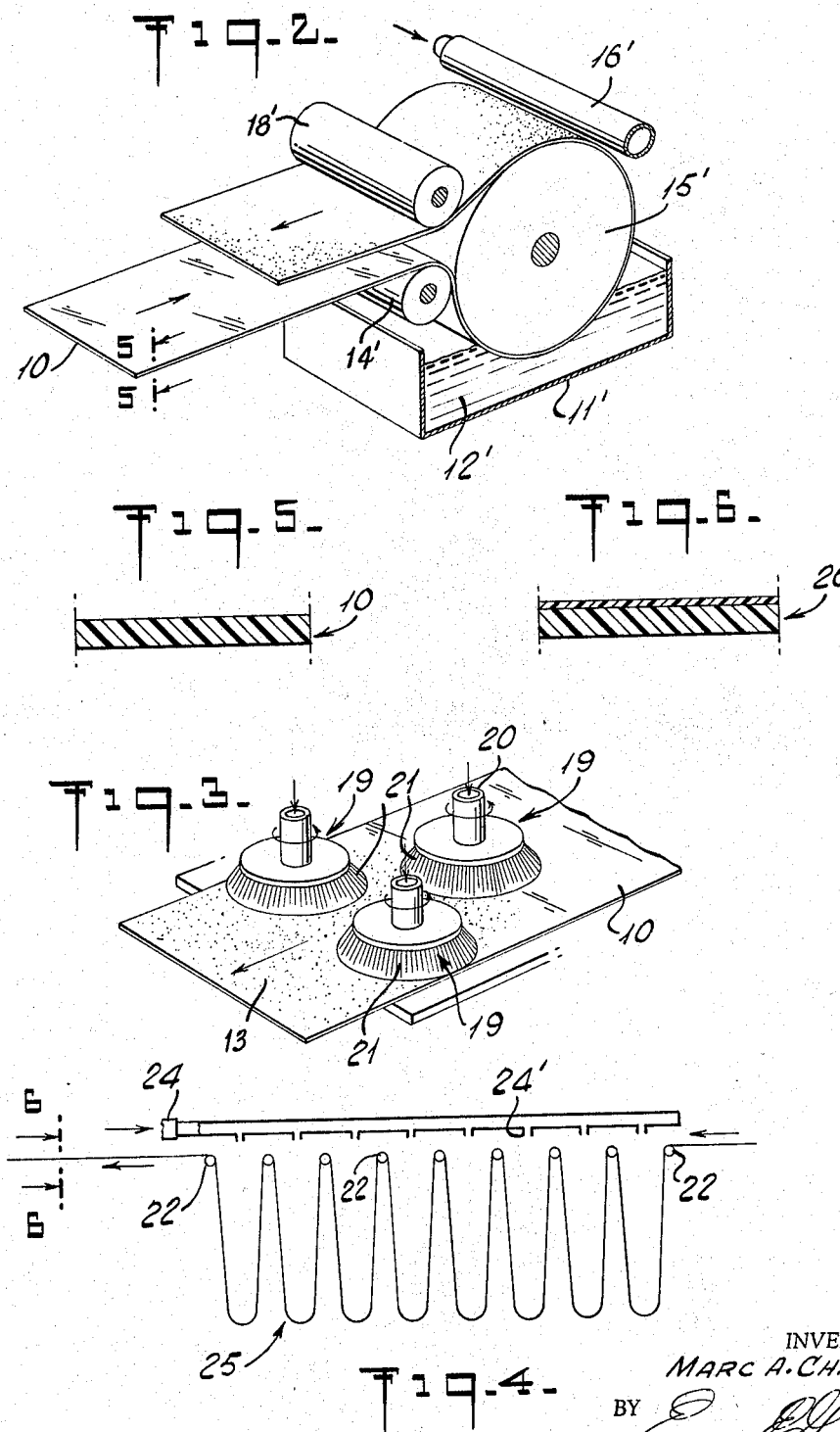

Nov. 15, 1966  M. A. CHAVANNES  3,285,793
METHOD OF MANUFACTURING A COMPOSITE CELLULAR MATERIAL
Filed July 19, 1962  3 Sheets-Sheet 3
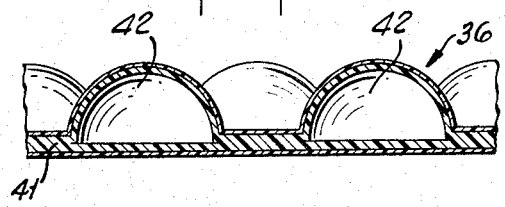
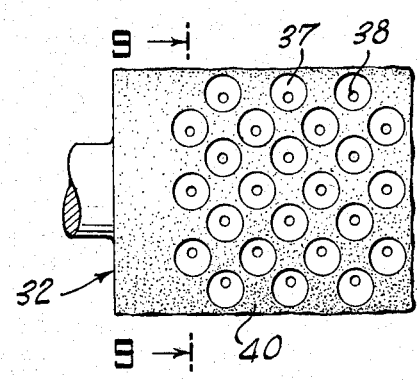
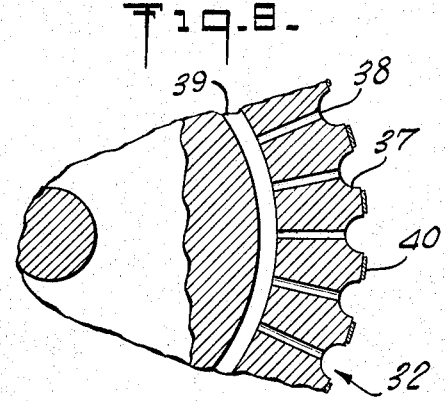
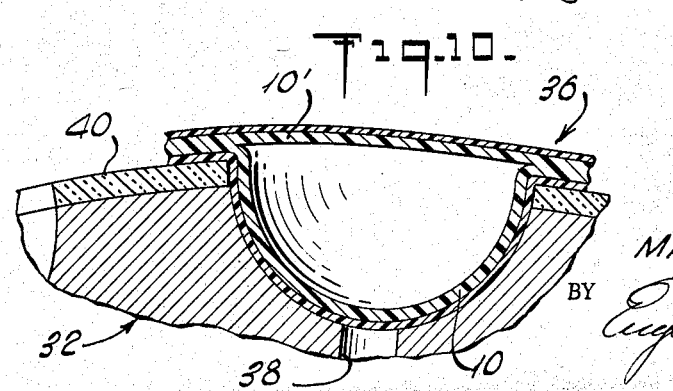
INVENTOR.
MARC A. CHAVANNES
BY
ATTORNEY United States Patent Office 3,285,793
Patented Nov. 15, 1966

3,285,793
METHOD OF MANUFACTURING A COMPOSITE CELLULAR MATERIAL
Marc A. Chavannes, Brooklyn, N.Y., assignor to Sealed Air Corporation, Hawthorne, N.J., a corporation of New Jersey
Filed July 19, 1962, Ser. No. 210,902
8 Claims. (Cl. 156—210)

This invention relates to embossed multiple laminated materials and more specifically embraces a new and improved method and apparatus for the production of multi-laminate embossed materials which are useful among other things for protective and cushioning applications, requiring a high degree of tensile strength, resistance to chemicals, fire and smoke, and imperviousness to gases and vapors.

Manufacture of laminated cushioning materials has been generally accomplished by the use of adhesives, or by heating the surface of the basic layers of thermo-plastics, to be brought in contact, to a tacky state and then joining them under pressure. This invention constitutes an improvement over prior known processes and apparatus which not only facilitates the manufacture of new laminated cushioning materials, but also provides an improved resultant product of greater strength, durability and versatility.

Another objective of this invention encompasses the provision of a new and improved method and apparatus wherein a laminate used in the production of cushioning material contains at least one layer serving as a special carrier, permitting other laminae to be preheated safely to a relatively high degree and assuring a complete bond with an overlying layer to form a unitary laminate.

A further objective of the invention entails the provision of a new and improved method and apparatus for making laminated materials that is characterized by its simplicity, the attainment of a good bond and relatively low cost.

A still further objective of this invention resides in the provision of a new and improved cushioning material wherein the advantageous properties of plastics normally used are still further enhanced and reinforced.

A still further objective of this invention is manifested in the provision of a new and improved multiple laminate cushioning material, the inherent characteristics of which comprise relatively higher tensile strength, reduced porosity, and higher resistance to heat and pressure.

Still another objective of this invention resides in the provision of novel and improved apparatus for the manufacture of cushioning materials, that enable the attainment of greater speed and efficiency and the production of an improved resultant product.

Still another objective of the invention resides in the provision of a novel and improved method for making cushioning material.

A still further objective of the invention resides in the provision of a new and improved cushioning material.

The above and further objectives and advantages of this invention will become more apparent from the following description and supporting drawings forming part of this application:

In the drawings:
FIG. 1 is a diagrammatic illustration of one embodiment of the invention.
FIG. 2 is a perspective view of apparatus in accordance with the invention for laminating plastic materials.
FIG. 3 is a perspective view of a modified embodiment of apparatus for laminating plastic materials.
FIG. 4 is a diagrammatic illustration of apparatus for drying the laminate produced by the apparatus shown in FIGS. 2 and 3.

FIG. 5 is a fragmentary cross-sectional view of the plastic layer prior to lamination and taken along the line 5—5 of FIG. 2.
FIG. 6 is a fragmentary cross-sectional view of the resultant laminated material and taken along the line 6—6 of FIG. 4.
FIG. 7 is a cross-sectional view of an embossed cushioning material in accordance with the invention.
FIG. 8 is an elevational view of a portion of the vacuum embossing roller shown in FIG. 1.
FIG. 9 is a fragmentary cross-sectional view of the vacuum embossing roller shown in FIG. 8 and taken along the line 9—9 thereof.
FIG. 10 is a magnified cross-sectional view of the surface of the vacuum embossing roller of FIG. 8 carrying a section of embossed cushioning material in accordance with the invention.

Broadly, the process in accordance with the invention concerns an improved method and apparatus for manufacturing cushioning material utilizing two composite layers of plastic material, at least one of which is embossed and the other is sealed to the embossed layer to form a plurality of sealed air cells. Through the utilization of the composite sheets of material, wherein said sheets each consists of a layer of a plastic material having a relatively high melting point and a layer of material having a relatively low melting point. It is possible to heat these two composite sheets to bring the low melting point layers to a temperature that will insure fusion between the two sheets without the need for careful temperature control in preheating the sheets, which has heretofore been necessary to avoid damage or distortion of the sheets during the fabricating process. With the utilization of composite sheets, it is possible to select materials for each layer that will not only enable the attainment of the advantages outlines above but will also provide a more durable material having reduced porosity to gases and moisture.

The invention further contemplates an improved method and apparatus for producing composite plastic sheets which insure a positive bond between the layers of each composite sheet and enables the lamination to be accomplished continuously and as one step in the process for producing the resultant cushioning material. The fabrication of cushioning material utilizing two sheets of plastic material wherein at least one of said sheets was embossed has presented a problem in effecting careful control of the temperature. With this invention, one of the layers of each composite sheet is used as a carrier for the second layer and in so doing, it is possible to heat the second layer to a temperature above the actual melting point without damaging or otherwise distorting it. In this way, even though the second layer may be cooled to some degree prior to the sealing of the sheets, one to the other, the layers of the sheets which are brought into contact can be easily maintained at the fusing temperature.

This invention further enables the utilization of exceedingly thin composite sheets which produce a lighter and more durable material and at the same time, the product is rendered more impervious to gases, moisture and liquids.

Referring now to the drawings and more specifically to FIG. 1, one form of the apparatus for the manufacture of a multi-laminate is shown wherein the two laminae are processed independently to provide each with a fine coating of a second plastic. Since the process in each case is relatively identical, the processing of only one lamina will be described.

Although a large variety of plastic combinations may be used in the manufacture of a multi-laminate cushioning material, for the purpose of clarity, the initial lamina 10 will be identfied throughout the specification as a low density ethylene polymer and the plastic coating 11 shall be identified as a vinylidene chloride polymer. In this embodiment of the invention, lamination is accomplished by a bath 12 containing a plastic emulsion 13 through which the lamina 10 is conveyed by means of a feed roller 14 feeding the lamina onto a relatively larger roller 15, the latter being partially immersed in the emulsion 13. An even and smooth distribution of the emulsion 13 on the lamina 10 is assured by the action of an air doctor 16 which removes excessive emulsion. The coated web 17 is then conveyed over a second roller 18 and then to drying apparatus 25.

A perspective view of this method of applying a film of plastic to a continuous web is shown in FIG. 2 having portions of the bath 12 cut away to allow a clearer insight into the apparatus for immersing the web 10 in the emulsion 13.

Another method of applying a film of one plastic to a continuous layer of another plastic is shown in FIG. 3, wherein a plurality of rotary brushes 19 are supplied with a plastic emulsion 13 through feeder tubes 20. The bristles 21 of the rotary brushes 19 spread an even film of the plastic emulsion on one surface of the lamina 10 as it is conveyed beneath the rotary brushes. It is understood, of course, that a similar end may be obtained by spraying the emulsion against one surface of the plastic laminate or by any suitable method. Furthermore, a laminate of two distinctive continuous sheets of plastic could be produced by adhering the two layers to each other by introducing an adhesive. In this connection, a variety of epoxy resins and a number of elastomers such as polymerized chloroprene or neoprene have shown very satisfactory results.

After the emulsion 13 has been applied to the continuous lamina 10 by any of the preceding methods, the coated lamina 17 is conveyed in festoon fashion over a plurality of rollers 22 in order to increase the drying area, while hot air is supplied through pipe 24, having a plurality of openings 24' correlated in position with each loop of material and facing downwardly into the spaces provided by the festoons. When used in connection with a combination of polyethylene and vinylidene chloride polymer, the heated air would be maintained at a temperature of approximately 100° to 130° F., and preferably at about 110° F. The festoons 25 may be approximately eight feet deep, and about five minutes drying time would be required at the suggested temperatures. In this manner, drying operations may be carried out within a small area and at relatively high speeds. A more detailed sketch of the drying apparatus in operation is shown in cross-section in FIG. 4.

The second lamina 10' may be processed in substantially the same manner as illustrated and described in connection with lamina 10, and elements of the apparatus for coating the lamina 10' have been identified by like primed numerals. The emulsion 11' may be dried in the same manner illustrated and described in connection with the lamina 11 or both the lamina 11 and 11' may be dried by the utilization of radiant energy. For this purpose, a radiant heater 23 (see FIGURE 1) would be disposed in proximity to the lamina to be dried, and energy applied by means of appropriate conductors 23a and 23b. The radiant heater may take any desired form depending on the specific wave length required to effect the drying operation. If desired, the lamina to be dried may be passed through an appropriate oven containing heating lamps or other types of heat radiators or generators for imparting heat to the layer 11 or 11' as the case may be at a rate and for a period of time that will completely dry the layer prior to preheating of the laminae 26 or 26' for application to the embossing and laminating roller 32. Radiant heat may also be obtained by utilization of a suitable fluid heater wherein a high temperature liquid or gas is fed an appropriate radiator.

A cross section of the initial lamina 10 is illustrated in FIG. 5, while a cross section of the resultant laminate 26 is shown in FIG. 6.

Subsequent to drying operations, the two laminae 26 and 26' described are conveyed over cooperating and synchronized systems of rollers to an embossing roller for further processing. Rollers 27 and 27' are arranged to feed the two laminae to two sets of rollers 28 to 31 and 28' to 31' which are internally heated at successively increasing temperatures for gradually heating the plastic layers at least to the fusing temperature of the plastic having a lower melting point.

Speaking in terms of a laminate having the combination of a relatively low density polyethylene of one mil thickness and a vinylidene chloride polymer, such as Saran of .2 mil thickness, the successive increase in temperature would be arranged approximately in the following manner: Rollers 28 and 28' having a large diameter such as 24" to provide more surface allowing sufficient time for the cold web to absorb the first substantial temperature change, would have a temperature of about 180° F. Rollers 29 and 29' of a lesser diameter such as 12" would be preheated to a temperature of 200° F. Rollers 30 and 30' having a diameter of approximately 8" would have a temperature of 220° F. and roller 31 having a diameter of approximately 6" would be preheated to 240°; while roller 31' would be preheated to a temperature of 265°. A low density polyethylene has a melting point of about 230° F., while a vinylidene chloride melts at about 375°. Since the melting point of the poly-vinylidene chloride is never reached, this layer serves during the process of manufacture as a carrier for the polyethylene, the melting point of which is exceeded on rollers 31 and 31'.

While both laminates 26 and 26' pass very rapidly over the increasingly heated rollers, the temperature of the roller 31', being only 10° above the melting point of the polyethylene, is sufficient to place the polyethylene in a fusable state in which it can be easily embossed with a plurality of depressions as it passes over the surface of the embossing roller 32 at 33. The second lamina 26 may be heated on roller 31 to a substantially higher degree than the melting point of the polyethylene in order to insure absolute fluidity of at least the exposed surface of the polyethylene as it is brought in contact with the corresponding layer of polyethylene of lamina 26' immediately subsequent to embossment. If desired, a radiant heater may be utilized to maintain the temperature of the layer 10' on the embossing roller after it leaves the roller 31' and prior to application of the second lamina 26.

This procedure assures a coalescent fusion between the two polyethylene layers as they are brought in contact on the embossing roller 32 at 34. Since the meeting surfaces of the polyethylene layers are generally above the fusion temperature, only very light pressure of the order of eight to ten pounds is needed at 34 to produce a coalescent union between these layers. This method makes operation at high speed possible. In actual practice, continuous speeds of approximately 300 to 500 ft. per minute and even higher may be attained. The compressed material is subsequently cooled by a water spray or similar means and the finished material 36 is then stripped off the embossing apparatus by roller 35 and conveyed to a suitable receiver.

Embossment of laminate 26' on roller 32 is preferably accomplished by vacuum means communicating with each individual depression 37 on the surface of the embossing roller indicated in FIGS. 8 and 9. In the embodiment shown, the hemispherical depressions 37 are connected by passages 38 connecting with the vacuum manifold 39 of the embossing roller 32. The surface of the roller surrounding the depressions 37 is preferably covered with a silicone material 40 to prevent possible adhesion of the highly preheated laminate to the surface of the molding roller during operation. Although the drawings indicate a hemispherical shape, both in the depressions 37 on the surface of the embossing rollers, as well as in the magnified cross-section 36 on the finished product, it is understood that the size, configuration, depth, symmetry and distribution of the embossments may be modified to suit any practical purpose or requirement.

An enlarged view of a section of the multi-laminate 36 while in engagement with the roller 32 is shown in FIG. 10. It is easily discernible here that the polyethylene palyers 10 and 10' retain their identity in both composite sheets throughout the area of embossment, whereas the polyethylene is united in one coalescent layer throughout the area of fusion 41. This phenomena can also be observed in the cross-section of the finished material 36 as shown in FIG. 7.

As pointed out earlier, the combination of polyethylene and polymerized vinylidene chloride was described in accordance with the method and resultant products of this invention, since these materials lend themselves readily to a lucid demonstration of the many advantages arising from the combination set forth. Many different plastics, however, can be used to obtain the same or similar results and inherent advantages. Combinations effectively used for example are Saran and vinyl, polypropylene and polyethylene, or Mylar (a product of E. I. duPont de Nemours and Co., Inc.) terephthalate resins in combination with vinyl or poly-vinylidene chloride. Polypropylene and polyvinylidene chloride would serve similarly as would polyamides and polyethylenes. Also, high density polymers of ethylene in combination with a low density polymers of the same plastic are equally effective. In the combinations mentioned, the first resin may be applied in emulsified form to a continuous layer of the second, and in each instance, a substantial difference in the melting points of the materials to be combined is desirable.

Generally, plastics having a high melting point also show a relative increase in density. As a result, the carrier laminae in the composite cushioning materials produced in accordance with the instant invention, usually also provide outer surfaces having a high degree of resistance to abrasion, pressure and stress. Furthermore, the greater density in the carrier laminae, makes the resultant cushioning materials impervious to gasses, particularly if a vinylidene chloride polymer is used.

From the preceding description, it becomes quite evident that the methods and resultant products described present a number of considerable advantages in that the invention provides greater efficiency in manufacture, while the qualities of the multi-laminates are significantly enhanced.

While only certain embodiments of this invention have been illustrated and described, it is understood that modifications and alterations may be made without departing from the true scope and spirit thereof.

What is claimed is:

1. The method of manufacturing a composite cellular material comprising the steps of heating a first thermoplastic laminate having one laminae with a melting point above that of the other laminae, said other laminae being heated to bring its outer surface to a temperature in the vicinity of the melting point thereof, embossing said heated laminate by feeding it onto an embossing roller having a plurality of discrete recesses therein, said other laminae facing outwardly, heating a second laminate having one laminae with a melting point above the melting point of the other laminae, the outer surface of the other laminae of said second laminate being heated to a temperature in the vicinity of the melting point thereof, then feeding the said outer surface of the last said laminate into contact with the first said laminate while on the embossing roller to form a unitary structure with the embossed portions of the first said laminate being sealed, and then removing the composite structure from the embossing roller.

2. The method of manufacturing a composite cellular material according to claim 1 wherein said one laminae of each laminate contains polyvinylidene chloride.

3. The method of manufacturing a composite cellular material according to claim 1 wherein each laminate is formed of a relatively heavy layer of polyethylene and a relatively thin layer containing polyvinylidene chloride.

4. The method of manufacturing a composite cellular material according to claim 1 wherein each laminate is formed of a relatively heavy layer of polyvinyl chloride and a relatively thin layer containing polyvinylidene chloride.

5. The method of manufacturing composite cellular cushioning materials by joining two films of plastic one to the other comprising the steps of laminating a first film with a plastic layer having a melting point higher than the melting point of said first film, heating said laminated film to raise the temperature of said film above the embossing temperature and at least the outer surface thereof to a temperature in the vicinity of the melting point, said layer acting as a carrier for said film, feeding the heated laminated film onto an embossing roller with said heated film surface exposed to form a plurality of depressions each surrounded by unembossed portions, laminating a second film with a plastic layer having a melting point above the melting point of said film, heating said second laminated film to bring at least the outer surface of the film to a temperature in the vicinity of the melting point thereof with a plastic layer serving as a carrier for the film and then applying the outer surface of said second film into overlying relationship with the first said laminated film while on the embossing roller to seal said embossments and then stripping the resultant structure from said embossing roller.

6. The method of manufacturing a composite cellular material according to claim 5 wherein said layers contain polyvinylidene chloride.

7. The method of manufacturing a composite cellular material according to claim 6 wherein said films are formed of polyethylene.

8. The method of manufacturing a composite cellular material according to claim 6 wherein said films are formed of polyvinyl chloride.

References Cited by the Examiner

UNITED STATES PATENTS

| | | | |
|---|---|---|---|
| 1,954,635 | 4/1934 | Leonard | 18—10 |
| 2,032,114 | 2/1936 | Clements et al. | 161—73 |
| 2,335,222 | 11/1943 | Storch | 161—73 |
| 2,497,212 | 2/1950 | Donofrio | 156—210 |
| 2,633,442 | 5/1953 | Caldwell | 156—210 |
| 2,786,233 | 3/1957 | Merrill | 18—10 |
| 2,949,181 | 8/1960 | Buccino | 206—63.3 |
| 2,968,576 | 1/1961 | Keller | 117—47 |
| 2,978,006 | 4/1961 | Clemens | 161—127 XR |
| 3,142,599 | 7/1964 | Chavannes | 152—210 |

FOREIGN PATENTS

| | | |
|---|---|---|
| 908,579 | 10/1962 | Great Britain. |
| 1,245,096 | 9/1960 | France. |

EARL M. BERGERT, *Primary Examiner.*

H. F. EPSTEIN, *Assistant Examiner.*